US009236963B2

(12) United States Patent
Gadoury

(10) Patent No.: US 9,236,963 B2
(45) Date of Patent: Jan. 12, 2016

(54) BROADCAST MEDIA STREAMING WITH CUSTOMIZED PLAYLIST INSERTION METHOD AND SYSTEM

(75) Inventor: Jean-François Gadoury, St-Lambert (CA)

(73) Assignee: VECTOR TRITON (LUX) 1, S.ÁR.L.—DELAWARE BRANCH, Wilmington, DE (US)

( * ) Notice: Subject to any disclaimer, the term of this patent is extended or adjusted under 35 U.S.C. 154(b) by 293 days.

(21) Appl. No.: 13/349,757

(22) Filed: Jan. 13, 2012

(65) Prior Publication Data
US 2012/0184202 A1    Jul. 19, 2012

Related U.S. Application Data

(60) Provisional application No. 61/432,797, filed on Jan. 14, 2011.

(51) Int. Cl.
| H04H 40/00 | (2009.01) |
| H04H 20/38 | (2008.01) |
| H04H 20/10 | (2008.01) |
| H04H 60/06 | (2008.01) |

(52) U.S. Cl.
CPC .............. *H04H 20/38* (2013.01); *H04H 20/10* (2013.01); *H04H 60/06* (2013.01); *H04H 20/103* (2013.01)

(58) Field of Classification Search
CPC ............. G06F 15/16; G06F 3/00; H04N 7/10; H04N 7/025; G06W 30/00; H04H 40/00
See application file for complete search history.

(56) References Cited

U.S. PATENT DOCUMENTS

| 6,161,142 | A | 12/2000 | Wolfe et al. |
| 7,826,708 | B2 | 11/2010 | Herley et al. |
| 7,840,691 | B1 | 11/2010 | De Bonet et al. |
| 8,600,830 | B2 * | 12/2013 | Hoffberg .......... G06W 30/0207 705/14.71 |
| 2002/0032019 | A1 | 3/2002 | Marks et al. |
| 2003/0004793 | A1 * | 1/2003 | Feuer et al. ............ G06Q 30/02 705/14.5 |
| 2004/0197088 | A1 * | 10/2004 | Ferman et al. ........ G06F 3/0481 386/251 |
| 2006/0224971 | A1 * | 10/2006 | Paulin et al. ........... G06Q 30/02 715/758 |
| 2006/0288074 | A1 * | 12/2006 | Rosenberg ........... G06Q 20/102 709/205 |
| 2007/0220100 | A1 * | 9/2007 | Rosenberg ........ G06F 17/30053 709/206 |
| 2007/0265979 | A1 * | 11/2007 | Hangartner ............ G06Q 30/02 705/59 |

(Continued)

FOREIGN PATENT DOCUMENTS

| CA | 2297497 A1 | 8/2000 |
| WO | 2009/070343 A1 | 6/2009 |

OTHER PUBLICATIONS

Extended European Search Report for EP 12 73 4474; May 19, 2014.

*Primary Examiner* — Bobbak Safaipour
(74) *Attorney, Agent, or Firm* — Goudreau Gage Dubuc; Hugh Mansfield

(57) ABSTRACT

A method, system and server for customizing a broadcast media stream for delivery to a client associated with a user via a communication network. The broadcast media stream comprises a plurality of content segments, such as hosted segments, which are separated by a plurality of musical, informational or generic segments. During streaming the plurality of musical, informational or generic segments are modified based on one or more user preferences such that there content matches more closely the preferred content of the user.

5 Claims, 10 Drawing Sheets

(56) References Cited

U.S. PATENT DOCUMENTS

| | | | |
|---|---|---|---|
| 2008/0126109 A1* | 5/2008 | Cragun et al. | G06Q 30/0603 709/223 |
| 2008/0215172 A1* | 9/2008 | Digon | G11B 27/034 700/94 |
| 2009/0013363 A1* | 1/2009 | Lee et al. | H04H 20/24 725/110 |
| 2010/0011405 A1 | 1/2010 | Wu | |
| 2010/0153572 A1 | 6/2010 | Feig | |
| 2010/0191600 A1* | 7/2010 | Sideman | G06Q 30/02 705/14.53 |
| 2010/0235285 A1* | 9/2010 | Hoffberg | G06Q 20/401 705/75 |
| 2010/0251305 A1 | 9/2010 | Kimble et al. | |
| 2010/0317420 A1* | 12/2010 | Hoffberg | G06Q 30/0207 463/1 |
| 2012/0042337 A1* | 2/2012 | De Bonet et al. | G06Q 30/02 725/34 |
| 2012/0166289 A1* | 6/2012 | Gadoury et al. | G06Q 30/0269 705/14.66 |
| 2012/0311625 A1* | 12/2012 | Nandi | H04N 21/23418 725/28 |
| 2013/0097642 A1* | 4/2013 | Cragun et al. | G06Q 30/0603 725/59 |

* cited by examiner

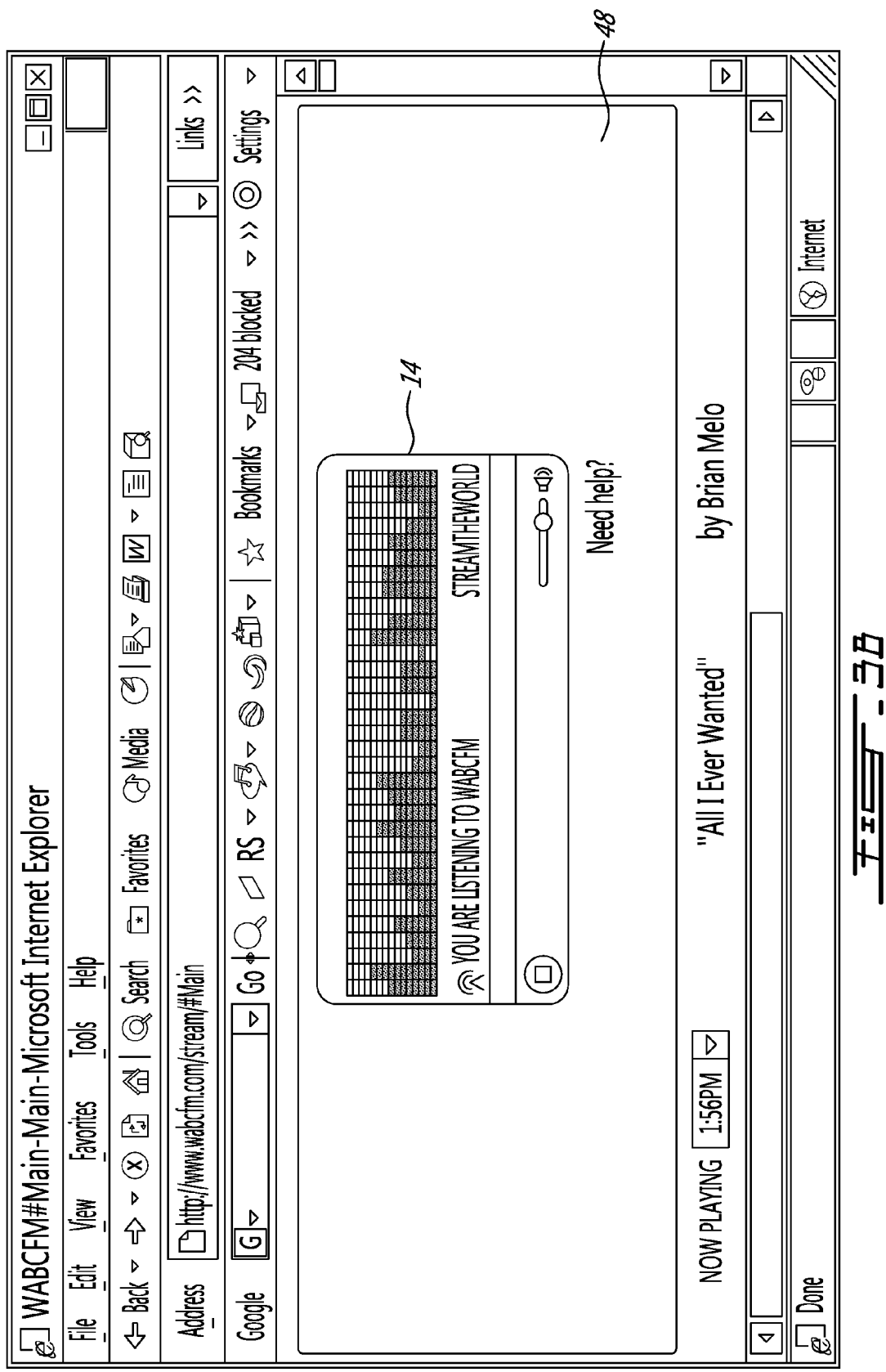

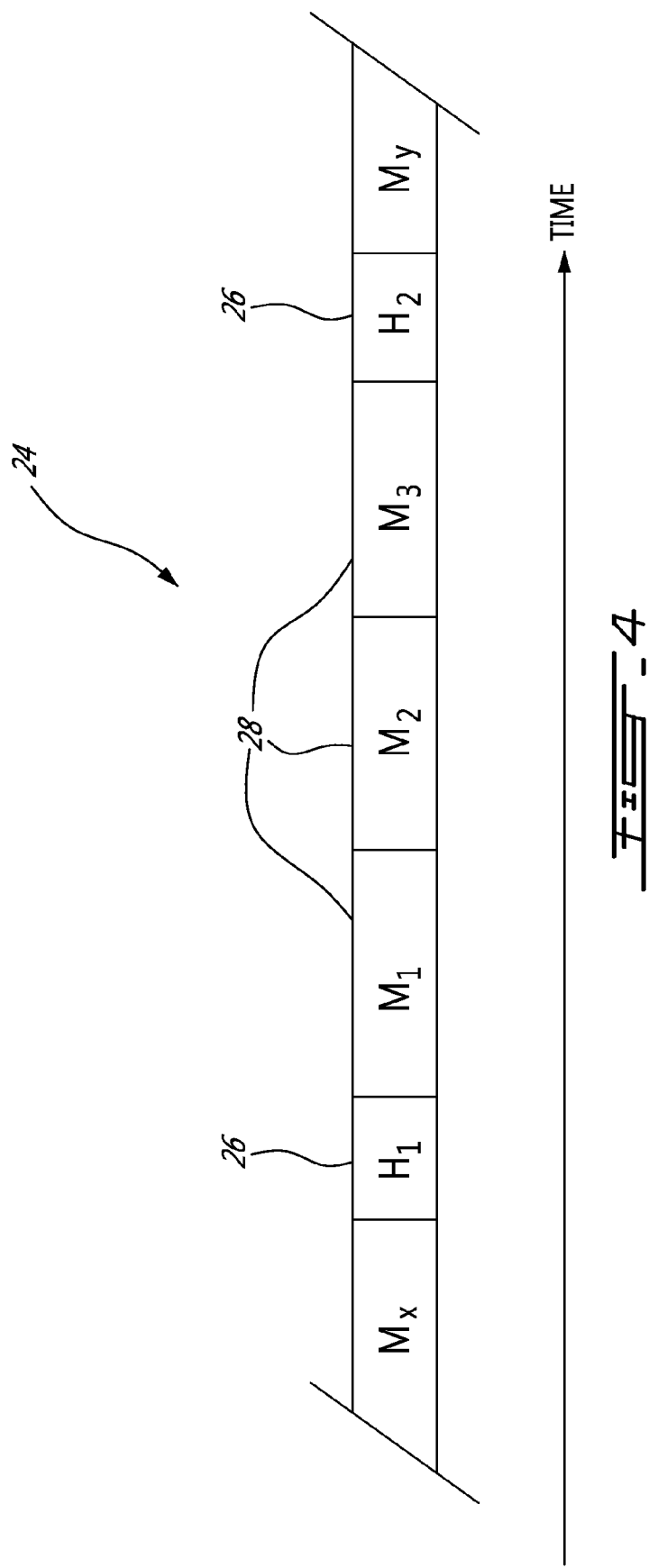

FIG. 5A

User Preferences

Preferred Play List | No Play List

Artists
Yanni ▼

Songs
Running Time ▼

Albums
Niki Nana ▼

Genre
☐ Pop/Rock
☑ Jazz
☐ R&B
☑ Country
☐ Blues
☑ Electronic
☑ Latin
☐ Reggae
☐ Int'l
☑ Classical

FIG. 5B

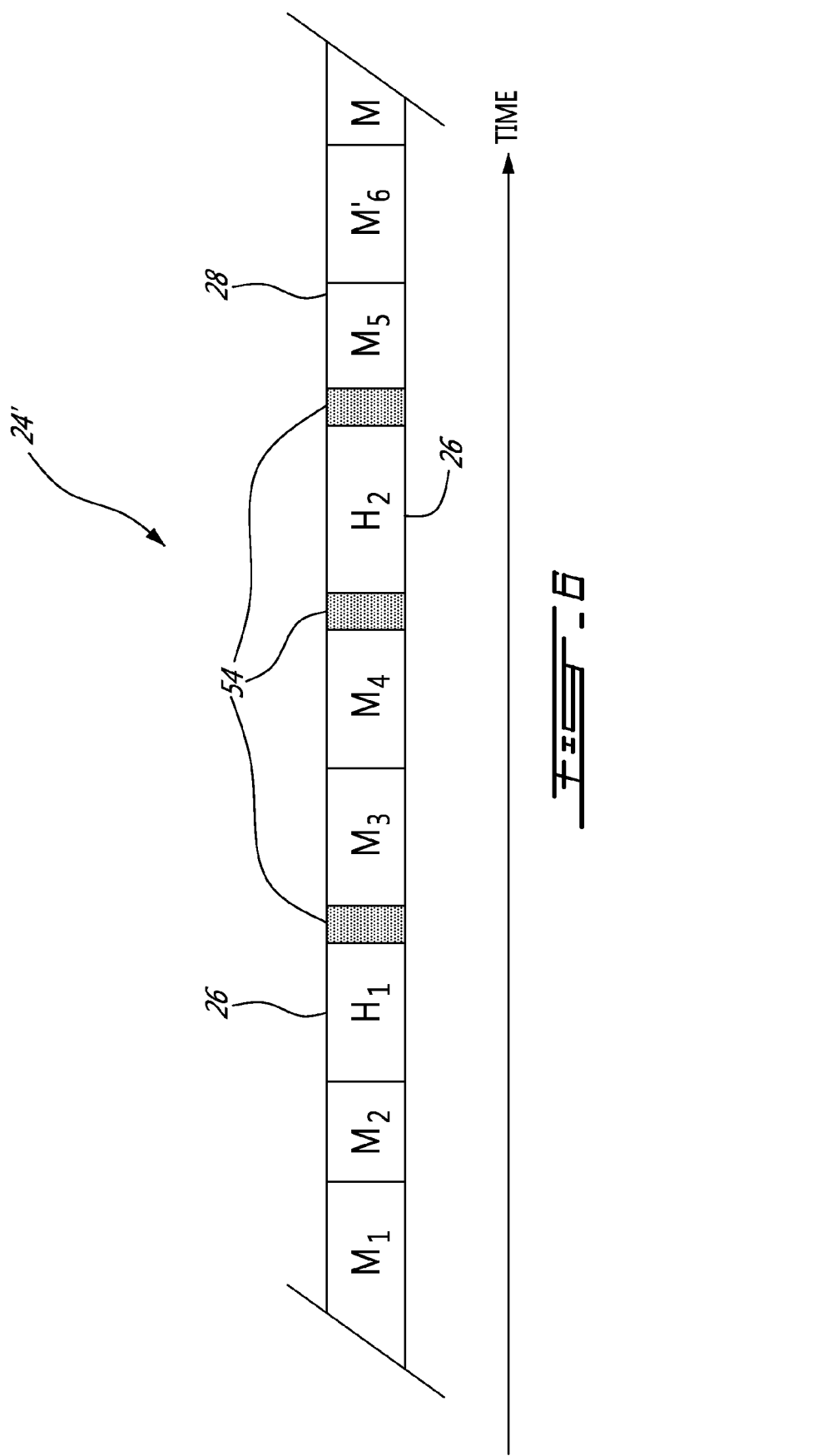

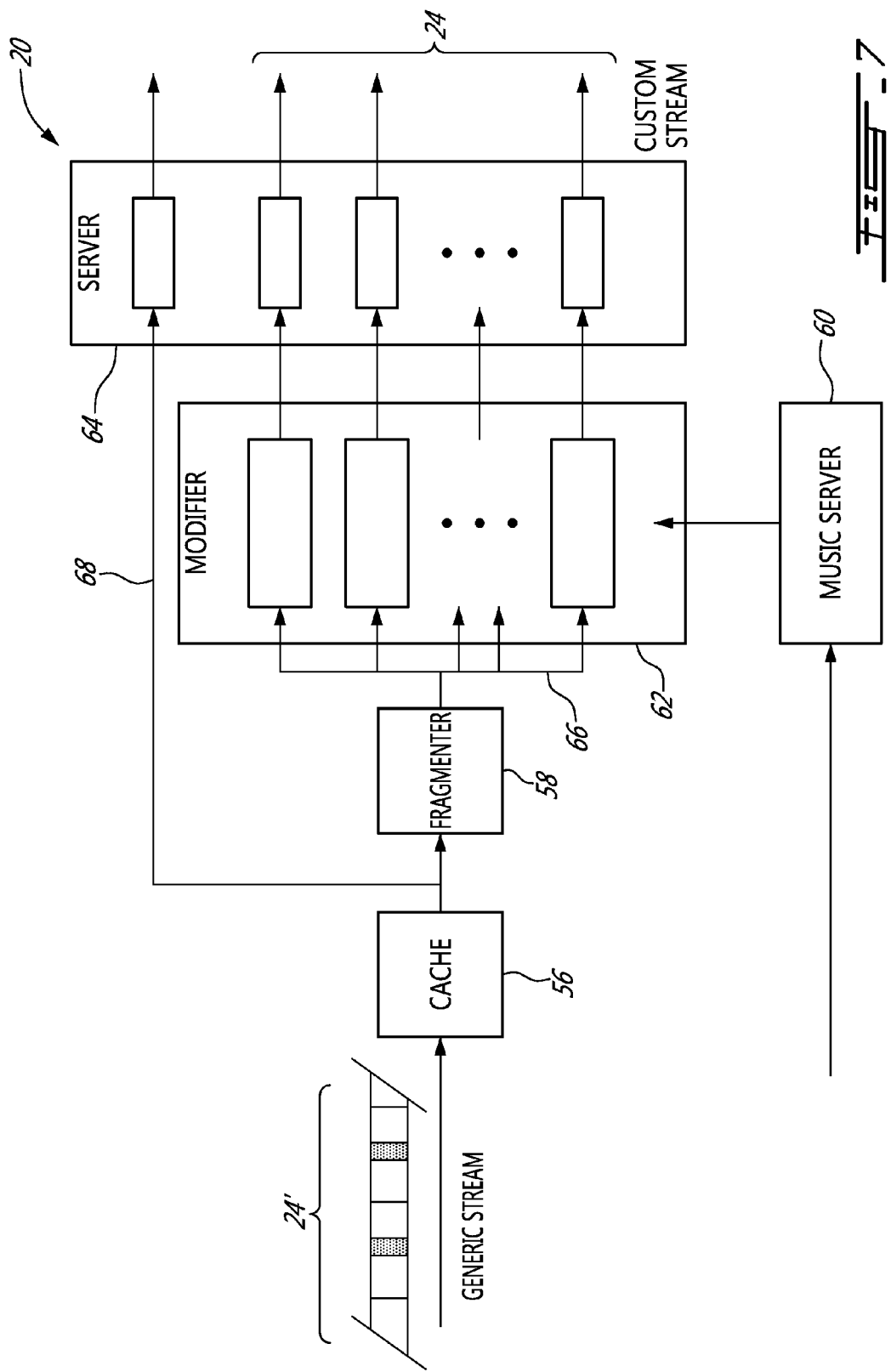

BROADCAST MEDIA STREAMING WITH CUSTOMIZED PLAYLIST INSERTION METHOD AND SYSTEM

CROSS REFERENCE TO RELATED APPLICATIONS

This application claims benefit, under 35 U.S.C. §119(e), of U.S. provisional application Ser. No. 61/432,797, filed on Jan. 14, 2011, which is incorporated herein in its entirety by reference.

FIELD OF THE INVENTION

The present invention relates to a broadcast media streaming with customized playlist insertion method and system.

BACKGROUND OF THE INVENTION

In broadcast programming, especially live broadcast radio shows that include music interspersed with a significant amount of talk, traffic and weather, such as morning shows and the like, a listener typically selects the particular broadcast based on a combination of the hosts and the broadcaster's play list. As a result, while a user may find the hosts pleasing, the playlist may include songs, musicians or types of music that the listener finds objectionable.

In other cases, portions of the broadcast may not be appealing to a particular listener, for example a particular song, artist or type of music which is found disagreeable to the listener. Unfortunately, in such a case broadcasting the particular song, artist or type of music may have the unintended effect of motivating the listener to select a different broadcaster, thereby depriving the broadcaster (and his associated advertisers) of a portion of the listening audience.

In still other cases, the listener or viewer may wish to have some additional content, such as news and weather forecasts, but not traffic reports or the like, or the user may wish to have such content customized to a particular region.

The prior art reveals a variety of proposed systems and methods for substituting content such as advertising during detected breaks in broadcast programming, for example based on the presence of a detectable change in the broadcast stream or through provision of control information together with the broadcast stream. Additionally, the prior art also reveals that the types of content substituted may be based on listener or viewer characteristics, such as location and the like. Other prior art reveals virtual DJs which allow the listener to set preferences, such as preferred artists, albums or the like, which are then used to generate playlists, but no mechanisms are provided for substituting or integrating such playlists into a live broadcast radio program including a live host.

SUMMARY OF THE INVENTION

In order to address the above and other drawbacks there is provided a method for customizing a broadcast media stream for delivery to a client associated with a user via a communication network, the broadcast media stream comprising a plurality of content segments. The method comprises requesting at least one user preference from the user, detecting an attribute of a next content segment to be streamed, comparing the detected attribute with the at least one user preference wherein if the detected attribute does not accord with the at least one user preference, the next content segment to be streamed to the user is altered with an alternative content segment, the alternative content segment comprising an attribute which accords with the at least one user preference, and streaming the next content segment to the client associated with the user.

There is also disclosed a system for delivering a customized broadcast media stream to a plurality of users. The system comprises a communication network, a plurality of media clients, each of the media clients associated with a respective on of the users and at least one user preference associated with each of the users, a media server connected with each of the plurality of media clients via the communications network, a source of a media stream comprising a plurality of content segments, and a source of a plurality of alternative content segments, wherein for each of the plurality of media clients the media server detects an attribute of a next content segment to be streamed from the plurality of content segments and wherein when the detected attribute does not accord with the at least one user preference of the associated user, the next content segment is modified with an alternative content segment for streaming to the client, the alternative content segment comprising an attribute which accords with the at least one user preference.

Additionally, there is disclosed a media server for customizing a generic media stream comprising a plurality of content segments for delivery to a plurality of media clients via a communications network, each of the clients associated with a respective one of a plurality of users, each of the users having at least one user preference. The server comprises an interface for communicating with the plurality of media clients via the communications system, a storage system for holding a plurality of alternative content segments, a fragmenter for dividing the generic media stream into a plurality of sub streams, each of sub streams for streaming to an associated client via the interface, and a modifier for each of the sub streams, wherein for each sub stream, when the modifier detects that an attribute of a next content segment does not accord with the at least one user preference of the user of the client associated with the sub stream, the next segment is replaced with an alternative content segment comprising an attribute which accords with the at least one user preference.

BRIEF DESCRIPTION OF THE DRAWINGS

In the appended drawings:

FIGS. 3A and 3B provide illustrations of the web pages for accessing a live media serving system in accordance with an illustrative embodiment of the present invention;

FIG. 4 is an exemplary media stream comprising delimited host and musical segments;

FIGS. 5A through 5C provide versions of interfaces for selecting user preferences in accordance with an illustrative embodiments of the present invention;

FIG. 6 is the exemplary media stream of FIG. 4 comprising various host and musical segments delimited by embedded break markers in accordance with an illustrative embodiment of the present invention; and FIG. 7 is a block diagram of a media streaming device in accordance with an illustrative embodiment of the present invention.

DESCRIPTION OF ILLUSTRATIVE EMBODIMENTS

It is understood that in the present specification the term "live" is meant to designate real-time broadcasts of live events as well as live audio or video signals such as, for example, live radio or television shows and live concerts. It is also to be understood that although in the present specification reference is made to MP3 and FLV audio and other video formats, a person skilled in the art may also apply the present invention to other audio and video formats.

Figure 1:
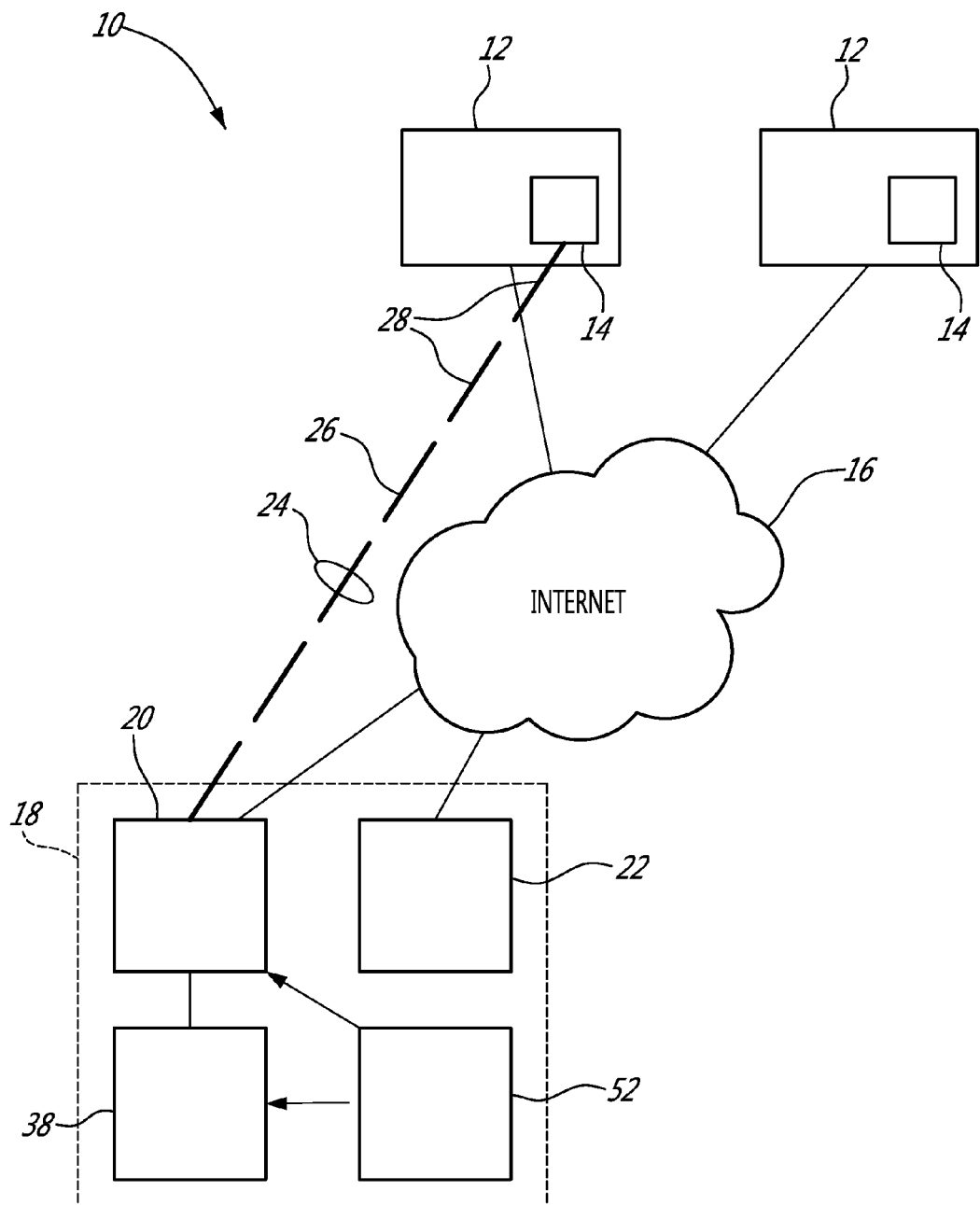
FIG. 1 is a schematic diagram of a broadcast media streaming with customized playlist insertion system in accordance with an illustrative embodiment of the present invention.

Referring to FIG. 1, a broadcast media streaming with customized playlist insertion system, generally referred to using the reference number 10, will now be described. Listeners/viewers using devices as in 12, such as a personal computer, a laptop computer, a personal assistant device, smartphone, or the like, and on which is installed a media client or application as in 14, for example an audio/video player such as Flash Player™, may access, via a broadband communication network as in 16, such as the Internet or the like, a content provider system 18 comprising a broadcast media streaming device 20 which may be accessed through, for example, a hyper link on a web page on a web server 22 via the Internet. The broadcast media streaming device 20 serves a hosted media stream 24 comprising live hosted segments 26 interconnected with inserted segments 28. In a particular embodiment the hosted media stream 24 could also comprise other segments, such as live or prerecorded weather and traffic reports and advertisements.

The content provider system 18 may be, for example, a commercial radio station, in a particular exemplary embodiment a commercial radio station with a hosted morning show or the like comprising talk radio, news, weather and traffic reports interspersed with music segments and the like. The web server 22 may optionally provide the listener/viewer with login access to detailed media stream information. The personal device as in 12 may connect to the web server 22 using an Internet connection such as, for example, Ethernet (broadband, high speed), wireless Wi-Fi, cable Internet, or the like.

Figure 2:
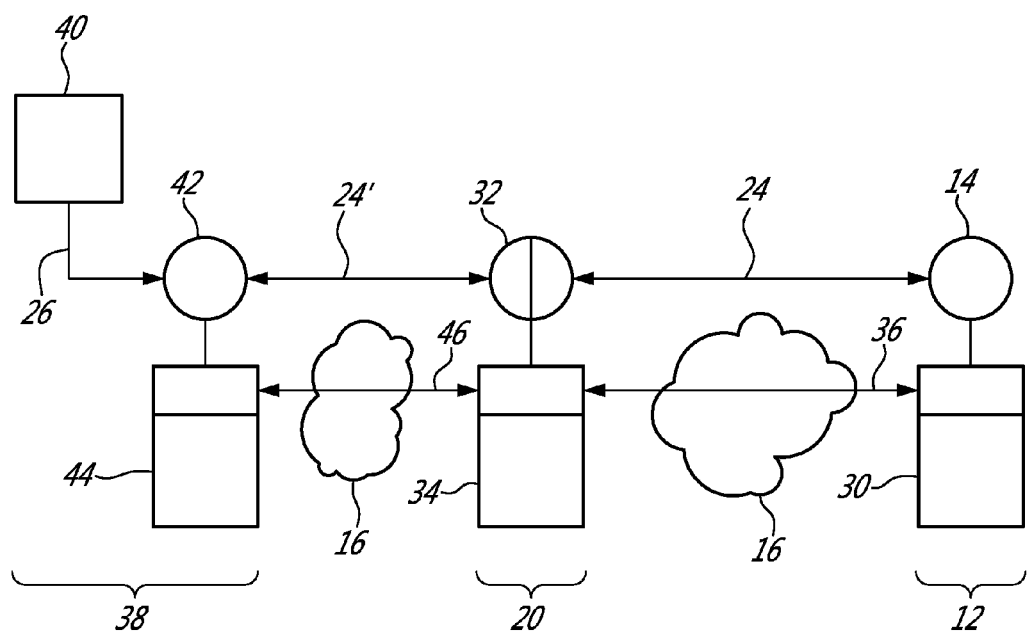
FIG. 2 is a communication diagram of a broadcast media streaming with customized playlist insertion system in accordance with an illustrative embodiment of the present invention.

Referring now to FIG. 2 in addition to FIG. 1, the personal device as in 12 comprising the media client as 14, typically in the form of a software application or module, gains access to the communications network 16 via a standardized communications interface 30, such as a TCP/IP stack or the like. As is generally known in the art, the use of such a standardized communication interface 30 ensures that the personal computing device as in 12 is able to communicate with other parties, such as the media serving device 20, via the communication network 16.

Still referring to FIG. 2, the media serving device as in 20 comprises a broadcast media server 32, typically in the form of a software application or module, which gains access to the communications network 16 via a standardized communications interface 34 using client-server protocols as are generally known in the art, such as a TCP/IP stack or other like client-server communication protocols, to communicate with the media client as in 14. As will now be clear to a person of ordinary skill in the art, once an end-to-end communications connection 36 has been established between the media server 32 and the media client as in 14, for example using the TCP/IP protocol, data typically in the form of data packets (not shown) can be exchanged between the media client 14 and the media server 32.

Illustratively, the content provider system 18 additionally comprises a media acquisition device 38 comprising a live hosted stream generation part 40 and a live hosted segment acquisition part 42. Illustratively, the hosted stream generation part 40 and the hosted segment acquisition part 42 are applications running on the same system and communicate via internal communication channels of the system in question (all not shown). The hosted stream generation part 40 comprises appropriate hardware and software to acquire and convert a live broadcast (such as a hosted radio program) into the series of live hosted segments 26.

Still referring to FIG. 2, the hosted segment acquisition part 42 illustratively acquires live streaming media from the live hosted stream generation part 40. As discussed in part above, the live stream generation part 40 could be, for example, a live radio broadcast associated with the content provider system 18 which is encoded into a suitable digital format such as WAV, AIFF, AU or raw header-less PCM, for streaming to the live segment acquisition part 42. The media acquisition device 38 further comprises a standardized communications interface 44, such as a TCP/IP stack or the like. The hosted segment acquisition part 42 uses the communications interface 44 to interconnect with the media server 32, illustratively through an end-to-end communications connection 46 established between the hosted segment acquisition part 42 and the media server 32 over the communications network 16.

Still referring to FIG. 2, the media server 32 and the hosted segment acquisition part 42 and their respective communications interfaces 34, 44, could be implemented, for example, as applications executing on computer hardware (not shown). In an alternative embodiment they could also be integrated on the same platform.

Still referring to FIG. 2, once the communications connection 46 has been established between the hosted segment acquisition part 42 and the media server 32, by methods as are generally known in the art, for example using an HTTP Get including an appropriate URL referencing the particular live stream or mountpoint on the media server 32, hosted segments 26 acquired by the live segment acquisition part 40 and musical segments (reference 28 in FIG. 1) are illustratively supplied to the media server 32 as a generic stream of digital data in the hosted media stream 24', typically in the form of a series of media data packets (not shown) in a known format, such as an MP3 audio stream or FLV (Flash Video) or the like. The initial media data packet(s) typically include headers comprising information related to the hosted segments 26 and the generic or default musical segments 28' which can be stored by the media server 32 for subsequent transmission to the media client as in 14.

Figure 3A:
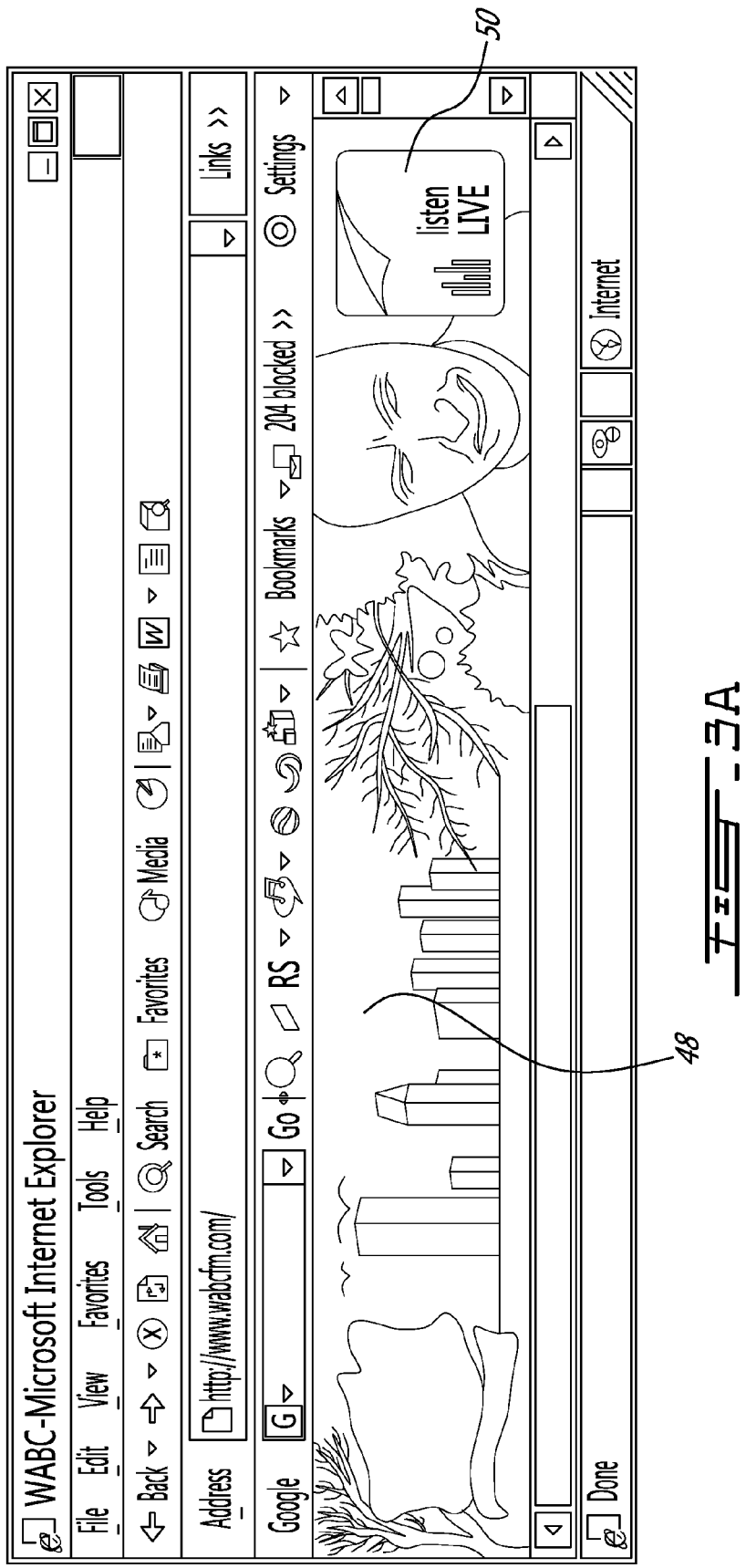

Referring now to FIGS. 3A and 3B in addition to FIG. 2, connection between the media server 32 and the media client 14 is illustratively carried out by positioning, on a web page 48 of the web site hosted by the web server 22 of the content provider system 18, an appropriate illustrative icon 50 which is associated with an appropriate hyper link. For example, for a hosted media stream 24 generated by an online radio broadcasting system the illustrative icon 50 would typically indicate that the user can listen to the broadcast by selecting the illustrative icon 50 or button in question. Selecting the illustrative icon 50 or button would launch the media client as in 14 which would subsequently initiate an HTTP connection with the media server 32. Typically, this involves the establishment of a TCP/IP connection between the media client as in 14 and the media server 32 on a known port which is used to transmit an HTTP Get. Once the TCP/IP connection has been established, the HTTP Get is transmitted to the media server 32 together with information as to the stream. Typically this information is in the form of a mountpoint to which the media client as in 14 will be connected in order to receive, as will be discussed in more detail below, the hosted media stream 24.

Referring now to FIG. 4 in addition to FIG. 1, as discussed above the hosted media stream 24 illustratively comprising a plurality of hosted segments $H_n$ as in 26 which may also be intermingled with a plurality of musical segments $M_n$ as in 28. For example, in FIG. 4 musical segments $M_1$, $M_2$ and $M_3$ have been inserted between hosted segments $H_1$ and $H_2$. Note that in a particular embodiment, the insertion of advertisements and other forms of media or programming, such as traffic or weather reports may also be made, but is not shown.

Still referring to FIG. 4, musical segments as in 28 inserted into the hosted media stream 24 may be retrieved from a plurality of prerecorded musical segments stored on an music server (reference 52 in FIG. 1), which are stored on storage devices that are generally known in the art, such as hard disks or solid state memory, based on configuration settings such as user preferences.

Figure 5A:
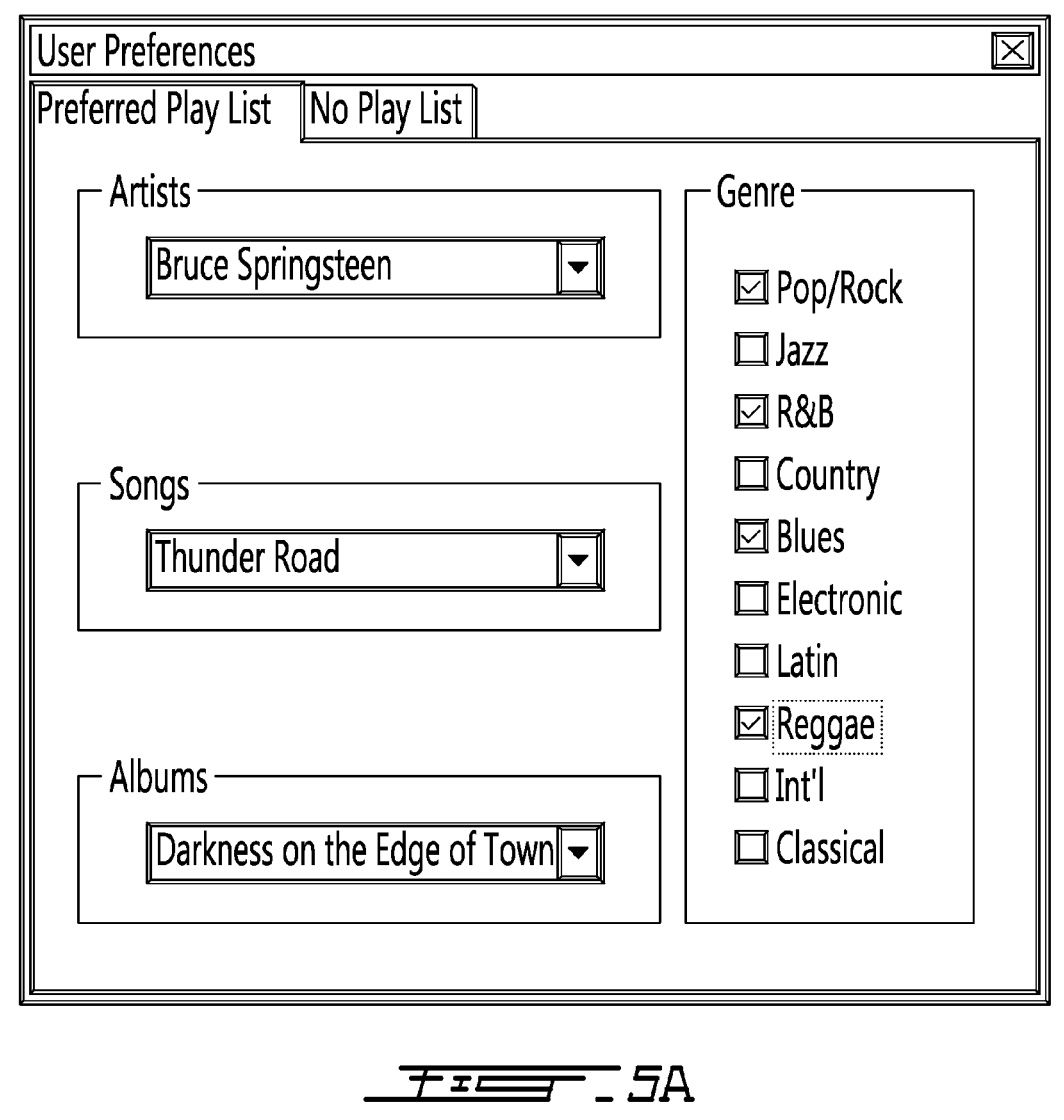

Indeed, referring now to FIGS. 5A and 5B in addition to FIG. 1 the user may illustratively set musical preferences via the client 14 by selecting artists, genres and the like allowing the generation of preferred play lists (FIG. 5A) and no play lists (FIG. 5B). Preferences used for generating playlists are generally gathered when a media client as in 14 connects to the content provided system 18, prior to transmission of the hosted media stream 24 to the media client as in 14.

Figure 5C:
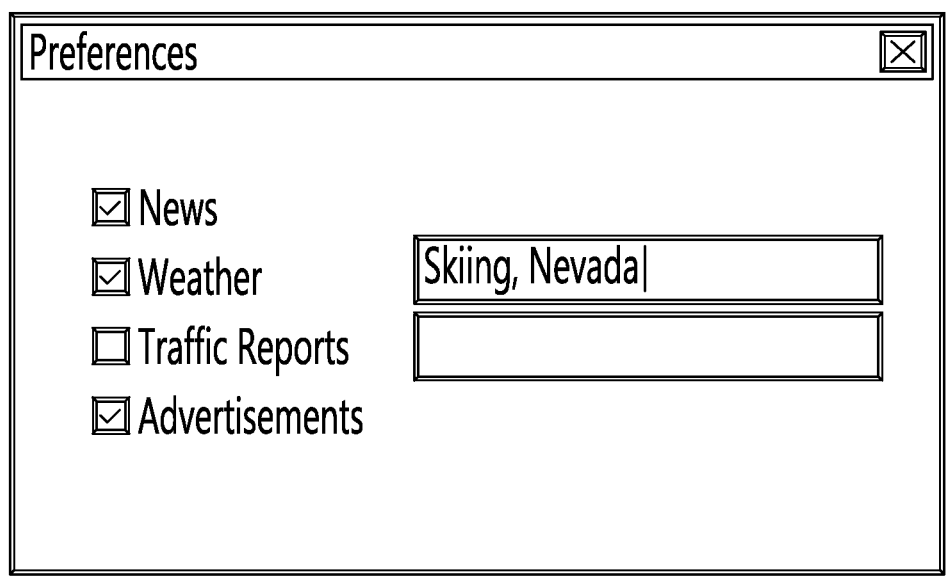

Referring now to FIG. 5C, in an additional illustrative embodiment the user may also select user preferences regarding the broadcast other types of content, such as news, weather, traffic reports, advertisements and the like. For example, selection of weather reports and a particular region would allow for the insertion of weather reports for that region into the broadcast stream, or replacement with existing (for example national) weather reports with regional reports or specialty reports, such as those related to a particular sport. Alternatively, non-selection of one of the additional types of content would lead to that content being replaced with another type of content, such as music or the like, in the event that that type of content is found in the broadcast stream. For example, news forms a typical portion of the hosted broadcast stream, but if not selected would be replaced by another form of content such as music or the like.

In a first embodiment the preferred play lists and no play lists are used to generate customized musical sections for insertion as musical segments $M_n$ between the hosted segments $H_n$ by the media acquisition device 38. As a result, and with reference back to FIG. 2, a hosted media stream 24' is generated which includes a hosted part intermingled with musical selections chosen according to the users preferences. Additional processing is provided to modify the hosted media stream 24' into an appropriate container based on the AIFF, WAV or XMF formats generally used for framing audio streams. Similarly, pre-framing may involve framing the hosted media stream 24' media format into a container based on the AVI, Flash Video, MPEG-2 format, or the like, which are generally used for framing audio and video streams.

Referring now to FIG. 6, during encoding of the hosted media stream 24' by the hosted stream generation part 40, the hosted segments $H_1$, $H_2$, $H_n$, and the musical segments as in $M_1$, $M_2$, ... $M_n$ may be delimited by trigger or break markers as in 54, which may be inserted or encoded into the hosted media stream 24' during an encoding process of the media acquisition device 38 in accordance with an illustrative embodiment of the present invention. Similarly, individual or groups of hosted segments as in 26 and/or musical segments as in 28 may also be delimited by break markers 54 for the modification of these groups and/or individual segments. The break markers 54 may illustratively be in the form of metadata associated with a particular time point or points embedded within the hosted media stream 24'. Alternatively, the break markers 54 may comprise tags, executable program code, scripts, or the like, with the objective of marking the end or beginning of either a hosted segment 26 or a musical segment 28 at different points in time for the purpose of delimiting the hosted content from the musical content in the hosted media stream 24'. Such encoded metadata may also serve to describe attributes of the program contents, such as signal levels, which may subsequently be used by the media serving device 20 to undertake certain operations. Additionally, encoded metadata may also include information related to program titles, program length, or the like. Generally, the break markers 54 will be used such that when the hosted media stream 24' reaches a certain time during the media modification process that is described herein below, a trigger marker event will be raised for instructing the media serving device 20 to modify the hosted media stream 24'. While the metadata has illustratively been shown to be embedded within the hosted media stream 24', these data items may alternatively be transmitted as separate control signals to the media serving device 20 for use thereby.

In a second embodiment, although a generic hosted media stream 24' generated by the hosted stream generation part 40 comprises both hosted segments 26 as in $H_1$, $H_2$, $H_n$, and generic musical segments 28' as in $M_1$, $M_2$, ... $M_n$, the break markers as in 54 are used to indicated points at which musical segments different from those currently encoded and based on user preferences, may be inserted or encoded into the hosted media stream 24' by the media server 20. This would allow, for example, the general musical selections to be determined in accordance with the host's requirements, but allow particular songs, artists or genres of music to be substituted when the host's selections do not conform to the preferences of the user as known to the media server 20.

For example if comparison of the encoded meta data indicates that a particular song in a musical segment is on the user's no play list, a suitable alternative song can be selected by the media server 20 according to the user's preferences and substituted within that musical segment. In an extreme case, for example where the host playlist is selected exclusively from a genre which is on the user's no play list, all musical segments could be removed and substituted for appropriate segments. Alternatively, the musical segments could be left blank by the hosted stream generation part 40 and customized playlists inserted by the media server 20 as required.

Note that although the above illustrative embodiment addresses the compilation and transmission of a stream to a user including a selection of music based on user preferences, other types of content such as news, weather, traffic reports and advertisements could also be included in the resulting stream based on user preferences.

Referring now to FIG. 7 in addition to FIG. 1, the operation of a media streaming device 20 will be described. Although, as discussed above, the hosted media stream 24' can be generated in a customized fashion by the media acquisition device 38 based on user preferences, typically in order to address issues such as scalability and the like it is preferable to transmit a generic hosted media stream 24' between the media acquisition device 38 and the media streaming device 20 which is subsequently modified by the media streaming device 20 according to user preferences.

When a media client as in 14 connects to the media serving device 20 of the content provider system 18, the connecting media client as in 14 and the user are categorized based on information gathered including user preferences as discussed above in reference to FIGS. 5A and 5B. The media serving device 20 comprises, in accordance with an illustrative embodiment of the present invention, a cache 56, a stream fragmenter 58, a music serving application 60, a stream modifier 62 and a streaming server 64. In an illustrative operation of the present invention, the media serving device 20 is supplied a hosted media stream to perform per stream real-time modifications of hosted media stream comprising, for instance the replacement of generic musical segments as in 28' already forming part of the hosted media stream based upon user preferences as set by the media clients as in 14 connected to the media serving device 20. Advantageously, the generic hosted media stream 24' is modified by the media serving device 20 in real-time and in a manner that does not impact the scalability and performance of the media serving device 20 delivering multiple media streams to a multiplicity of different media clients as in 14.

Still referring to FIG. 7, in a particular embodiment the hosted media stream 24' may be pre-processed, for example in order to transcode the generic hosted media stream 24'. Indeed, the generic hosted media stream 24' may be supplied from the media acquisition device (reference 38 on FIG. 2) in an encoding that is unsuitable for transfer to one or more of the media clients. In particular, transcoding illustratively involves altering the compression algorithm used to compress the generic hosted media stream 24' original format to the format used by the media serving device 20. Additionally, sampling rates, as well as the number of media channels of the generic hosted media stream 24' may also illustratively be adjusted during pre-processing to match the sampling rates and the number of channels of the format used by the media serving device 20. For instance, given a generic hosted media stream 24' encoded in a different compression format compared to the encoding used by the media serving device 20, transcoding illustratively adjusts the media stream to the same compression characteristics as that used by the media serving device 20. Additionally, transcoding may illustratively comprise converting WAV streams to MP3 streams.

Still referring to FIG. 7, pre-processing may further comprise the process of normalization. Since the generic hosted media stream 24' may be supplied from the hosted stream generation part 40 comprising audio with signal levels that do not match with that used by the media serving device 20, normalization of the audio in the generic hosted media stream 24' may be required to avoid clipping or inaudible audio signal levels. In order to normalize the generic hosted media stream 24' to the characteristics of the stream on media serving device 20, it may be necessary to uncompress the already compressed generic hosted media stream 24' in order to access the raw signal information. Once the raw signal information is obtained, the generic hosted media stream 24' will be readjusted to fit the requirements of a customised hosted media stream 24. To match these signal levels, information regarding the signal levels may be illustratively embedded within metadata of the generic hosted media stream 24' during its encoding at the hosted stream generation part 40 such that it may be decoded at this pre-processing stage to be used to normalize and match the input and target signals. In particular, normalization summary information which may be illustratively encoded within the generic hosted media stream 24' as metadata reflects the signal characteristics of the uncompressed form of the signal at its input to the media stream generation part 40. For instance, the inserted metadata may illustratively take the form of a normalized data summary that contains the state of the source raw signal at the moment the signal is encoded or may contain an averaged summary of the signal state between two time intervals. In accordance with an alternative illustrative embodiment of the present invention, normalization information may be passed along by the media serving device 20 to external applications that may rely on this information to adjust the signal characteristics of the generic hosted media stream 24'.

Still referring to FIG. 7, the modification of the media by the media serving device 20 in accordance with the illustrative embodiment of the present invention will now be described. In particular, there are provided multiple modification operations that the media serving device 20 supports which may illustratively occur at the beginning or the end of a connection between a media serving device 20 and a media client as in 14, as well as during a connection. To trigger modification operations, the live media serving system 10 uses the break markers 54 embedded within the generic hosted media stream 24' that may illustratively signal the beginning and end of hosted or musical segments 26, 28 and/or instruct media serving device 20 to undertake certain modification operations.

Still referring to FIG. 7, in order to facilitate the media modification process of the generic hosted media stream 24', there is further provided a local media storage module, such as a cache, or buffer, 56, to allow the generic hosted media stream 24' to be quickly accessible by the streaming modifier 62 while performing its modification processes. The cache 56 is illustratively provided in the form of the most common storage devices such as solid state memory-based storage devices which are generally known to be used in media servers applications. To improve the performance of the system, and in accordance with an alternative embodiment of the present invention, the generic hosted media stream 24' may be temporarily stored in an external high speed storage system (not shown) that is external to the media serving device 20. For instance, the external high speed storage system may be an external or remote hard drive or solid state memory, or any type of networked fast access data storage device that is generally known in the art.

Still referring to FIG. 7, the generic hosted media stream 24' is illustratively divided into a plurality of sub-streams as in 66 by the stream fragmenter 58 which splits the hosted media stream 24 into the plurality of sub-streams 66 that are to be individually and distinctly modified based on the categorization of the recipient media client as in 14. This dynamic sub-stream creation process advantageously reduces the resources required to achieve per stream real-time media modification, as media modification performed on a sub-stream as in 66 may be transmitted to a plurality of similarly categorized media clients as in 14 in a multicast manner. In particular, the sub-streams as in 66 are dynamically constructed or deconstructed as needed and according to the number of connected media applications as in 14 pertaining to a particular categorization of the media client as in 14 as described herein above. For instance, if a new session is initiated by a media client as in 14 whose user preferences are different from other already connected media clients 14, then a new sub-stream as in 66 is derived and constructed from the generic hosted media stream 24' to be modified in accordance with the user preferences of this media client 14. Similarly, once a session for a media client 14 of has ended, the sub-stream as in 66 for that session may be deconstructed if there are no other media clients as in 14 with the same user preferences connected. When several client applications as in 14 having the same user preferences are connected to the media serving device 20, the live media serving system 10 will direct the modifier 62 to perform real-time modification operations only once for a given sub-stream as in 66. In a particular, a default or uncustomised sub-stream 68, where the generic hosted media stream 24' is simply relayed by the media serving device 20, could also be provided for.

The creation of a such dynamic parallel streaming architecture based upon the categorization of the media clients as in 14 connected to the streaming server device 20 advantageously provides system scalability by combining multiple concurrent media servers that serve a multiplicity of distinct groups of media clients as in 14 so that stream modification is one on a per-stream basis. Accordingly, the live media serving system 10 thus shares resources between multiple connected media clients as in 14 of the like categorization. The live media serving system 10 as has been illustratively described advantageously requires less resources than a system comprising individual connections and less modifications per connected media client as in 14, as is the case in a unicast system, and is less rigid in its ability to target advertisements to specific groups of media clients as in 14, as is the case in a multicast system.

Still referring to FIG. 7, each time a break marker as in 54 is encountered within the generic hosted media stream 24', the stream modifier 62 performs a callout to the music server 60 that will provide a suitable musical segment to be used for the modification operations requiring the insertion of media into the generic hosted media stream 24'. In particular, the call out to the music server 60 will instruct the stream modifier 62 about the musical segment which should be used for insertion into a sub-stream or sub-streams as in 66. Illustratively the musical segments are stored in the music server (reference 52 in FIG. 1) which is external to the media serving device. The break marker as in 54 may also contain information specifying which type of operation should be performed on the sub-stream as in 66, such as an overlay or a deletion operation. When calling out the music server 60, the calling stream modifier 62 passes user preferences of the recipient media client 14 of that sub-stream 66 to the music server 60 in order to help it decide which musical segment should be used for insertion. The music server 60, upon receiving a call out from the stream modifier 62, performs a lookup in an active music segment list for correlating the user preferences with the musical segments and returns a musical segment and modification operation instructions to the stream modifier 62.

Although the present invention has been described hereinabove by way of non-restrictive illustrative embodiments and examples thereof, it should be noted that it will be apparent to persons skilled in the art that modifications may be made to the illustrative embodiments without departing from the spirit and the scope of the present invention.

The invention claimed is:

1. A media server for customizing an existing generic broadcast media stream comprising a plurality of content segments for delivery to a plurality of media clients via a communications network, each of said clients associated with a respective one of a plurality of users, each of the users having at least one user preference, the server comprising:
    an interface for receiving the existing generic broadcast media stream from a broadcaster;
    an interface for communicating with the plurality of media clients via the communications system;
    a storage system for holding a plurality of alternative content segments;
    a fragmenter for dividing the generic media stream into a plurality of sub streams, each of sub streams for streaming to an associated client via said interface; and
    a modifier for each of said sub streams, wherein for each sub stream, when said modifier detects that an attribute of a next content segment does not accord with the at least one user preference of the user of said client associated with said sub stream, said next content segment is replaced with an alternative content segment comprising an attribute which accords with the at least one user preference.

2. The server of claim 1, wherein the generic media stream is generated by an external source and further comprising an interface for receiving the media stream from the external source.

3. The server of claim 1, wherein said generic media stream comprises a live hosted audio stream comprising a plurality of hosted segments separated by a plurality of generic segments, said plurality of alternative content segments comprises a plurality of musical segments, said at least one user preference is a musical preference, and further wherein when said modifier detects that said next content segment is a generic segment, said modifier replaces said generic segment with one of said plurality of musical segments having an attribute which accords with said at least one user preference.

4. The server of claim 1, wherein said generic media stream comprises a live hosted audio stream comprising a plurality of hosted segments separated by a plurality of musical segments, said plurality of alternative content segments comprises a plurality of musical segments, said at least one user preference is a musical preference, and further wherein when said modifier detects that said next content segment is a musical segment comprising an attribute that does not accord with said at least one user preference, said modifier replaces said next segment with one of said plurality of alternative musical segments having an attribute which accords with said at least one user preference.

5. The server of claim 4, wherein said storage system comprises a music server and further wherein said modifier provides said music server with said at least one user preference said music server returns said modifier one of said plurality of alternative musical segments having an attribute which accords with said at least one user preference.

* * * * *